United States Patent
Yamamoto et al.

(10) Patent No.: US 8,381,243 B2
(45) Date of Patent: Feb. 19, 2013

(54) BROADCAST RECEIVING DEVICE

(75) Inventors: Naoki Yamamoto, Osaka (JP); Kosuke Kinoshita, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 692 days.

(21) Appl. No.: 11/965,918

(22) Filed: Dec. 28, 2007

(65) Prior Publication Data
US 2008/0163325 A1    Jul. 3, 2008

(30) Foreign Application Priority Data

Dec. 28, 2006    (JP) .................................. 2006-354787

(51) Int. Cl.
*H04N 7/16* (2006.01)
(52) U.S. Cl. ................. 725/28; 725/25; 725/27; 725/30
(58) Field of Classification Search .................... 725/25, 725/27–29
See application file for complete search history.

(56) References Cited

U.S. PATENT DOCUMENTS

| | | | | |
|---|---|---|---|---|
| 5,131,054 | A * | 7/1992 | Smith | 382/161 |
| 7,472,424 | B2 * | 12/2008 | Evans et al. | 726/27 |
| 2004/0083227 | A1 * | 4/2004 | Yocom | 707/101 |
| 2004/0125959 | A1 * | 7/2004 | Beuque et al. | 380/279 |
| 2005/0097595 | A1 * | 5/2005 | Lipsanen et al. | 725/25 |
| 2005/0256884 | A1 * | 11/2005 | Arnold et al. | 707/10 |
| 2005/0283807 | A1 * | 12/2005 | Lee et al. | 725/62 |
| 2007/0214472 | A1 * | 9/2007 | Kim et al. | 725/28 |
| 2008/0046914 | A1 * | 2/2008 | Gummadi | 725/25 |
| 2008/0216108 | A1 * | 9/2008 | Beaunoir et al. | 725/25 |

FOREIGN PATENT DOCUMENTS

JP    2000-354209 A    12/2000

OTHER PUBLICATIONS

"Program blocking technology requirements for television receivers"; Code of Federal Regulations; 47 CFR Ch. 1; Oct. 2006.

* cited by examiner

*Primary Examiner* — Scott Beliveau
*Assistant Examiner* — Jeremy Duffield
(74) *Attorney, Agent, or Firm* — Global IP Counselors

(57) ABSTRACT

A broadcast receiving device includes a table storage component, a viewing control acquisition component, a first determination component, a table acquisition component and a table updating component. The first determination component determines whether or not one of a following is satisfied: a column determination condition that a column number of a program viewing control information is greater than a first specific number of a first viewing control table, and a row determination condition that a row number of the program viewing control information is greater than a second specific number of the first viewing control table. The table acquisition component acquires a second viewing control table via a television broadcast when the first determination component determines that one of the column determination condition and the row determination condition is satisfied. The table updating component replaces the first viewing control table with the second viewing control table.

7 Claims, 6 Drawing Sheets

| RATING CATEGORY TYPE | TV-AA ORDER | TV-BB CATEGORY | TV-CC CATEGORY |
|---|---|---|---|
| LEVEL 1 | X | DD | HKF |
| LEVEL 2 | NC-17 | S | JJ |
| LEVEL 3 | R | RR | PP |
| LEVEL 4 | PG-13 | . . . | . . . |
| LEVEL 5 | PG | . . . | . . . |
| LEVEL 6 | G | . . . | . . . |
| LEVEL 7 | NR | . . . | . . . |

| RATING CATEGORY TYPE | TV-AA ORDER | TV-BB CATEGORY | TV-CC CATEGORY |
|---|---|---|---|
| LEVEL 1 | X | DD | HKF |
| LEVEL 2 | NC-17 | S | JJ |
| LEVEL 3 | R | RR | PP |
| LEVEL 4 | PG-13 | ... | ... |
| LEVEL 5 | PG | ... | ... |
| LEVEL 6 | G | ... | ... |
| LEVEL 7 | NR | ... | ... |

*FIG. 4*

BROADCAST RECEIVING DEVICE

CROSS-REFERENCE TO RELATED APPLICATIONS

This application claims priority to Japanese Patent Application No. 2006-354787 filed on Dec. 28, 2006. The entire disclosure of Japanese Patent Application No. 2006-354787 is hereby incorporated herein by reference.

BACKGROUND OF THE INVENTION

1. Field of the Invention

The present invention generally relates to a broadcast receiving device. More specifically, the present invention relates to a broadcast receiving device for receiving television broadcasts.

2. Background Information

Broadcast receiving devices receive television broadcasts and output the television broadcasts to monitors so that the television broadcasts are visible from outside. The number of channels that can be viewed has been increasing with an increase of popularity of digital broadcasts. There are now more programs that include violence, obscenity, and so forth. Therefore, there is a growing need to control the programs that can be viewed by children, so that the children will not be exposed to such programs.

With some conventional television receiver, a user selects in advance a rating level to be subject to viewing control (see Japanese Laid-Open Patent Application 2000-354209, for example). Rating information indicating viewing control conditions is extracted from a television signal. Specifically, the rating information is transmitted with the television signal. Then, a received rating level corresponding to the rating information is identified. If the received rating level is equal to or higher than the selected rating level, then viewing control is executed. In other words, viewing of the television signal is blocked.

Meanwhile, on Mar. 15, 2006, the FCC (Federal Communications Commission) mandated that broadcast receiving devices shall include a function for acquiring an RRT (Rating Region Table) transmitted in a broadcast and updating a viewing control table (hereinafter referred to as a rating table) based on the acquired RRT (see Code of Federal Regulations, Title 47—Telecommunication, Chapter I, §15.120, "Program blocking technology requirements for television receivers"). The rating table is a table that specifies viewing control conditions preset according to positions in a column direction and positions in a row direction.

Also, program viewing control information specifies the viewing control conditions for each program. The program viewing control information is information included in a program information table (event information table; hereafter referred to as "EIT"). The program viewing control information is transmitted as a CAD (Content Advisory Descriptor). The CAD specifies the viewing control conditions as number information indicating a position in a column direction of the rating table and as number information indicating a position in a column direction (see ATSC (Advanced Television Systems Committee) Standard A/65C, for example).

Therefore, the broadcast receiving device can set whether or not the program viewing control specified by the CAD is to be executed by referring to the rating table. However, it happens that the CAD indicating the specific location of an updated RRT is received before the updated RRT is received. The user cannot set whether or not to execute the viewing control corresponding to the CAD until the updated RRT is received.

Furthermore, the broadcast receiving device can be relocated from one area (hereinafter referred to as first area) to another area (hereinafter referred to as second area) when the owner moves, etc. If the RRT received in the first area and the RRT received in the second area have the same version information, then even though the table contents may be different, the RRT received in the first area and stored in the broadcast receiving device is not updated to the RRT received in the second area. In other words, when it is determined whether or not to update an RRT based on the version information of the RRT, the RRT is not updated if the RRT received in the first area has the same version information as the RRT received in the second area.

In view of the above, it will be apparent to those skilled in the art from this disclosure that there exists a need for an improved television receiving device. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a broadcast receiving device with which viewing control table information is properly updated.

In accordance with one aspect of the present invention, a broadcast receiving device for receiving a television broadcast includes a table storage component, a viewing control acquisition component, a first determination component, a table acquisition component and a table updating component. The table storage component is configured to store a first viewing control table having a first specific number of columns and a second specific number of rows, with viewing control conditions for viewing control. The viewing control acquisition component is configured to acquire program viewing control information that specifies the viewing control conditions for a program using a column number and a row number. The first determination component is configured to determine whether or not one of a following is satisfied: a column determination condition that the column number of the program viewing control information is greater than the first specific number of the first viewing control table, and a row determination condition that the row number of the program viewing control information is greater than the second specific number of the first viewing control table. The table acquisition component is configured to acquire a second viewing control table via the television broadcast when the first determination component determines that one of the column determination condition and the row determination condition is satisfied. The table updating component is configured to replace the first viewing control table with the second viewing control table.

With the broadcast receiving device of the present invention, it is possible to provide a broadcast receiving device with which viewing control table information is properly updated.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 4 is a diagram illustrating an example of a viewing control table;

DETAILED DESCRIPTION OF THE PREFERRED EMBODIMENTS

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
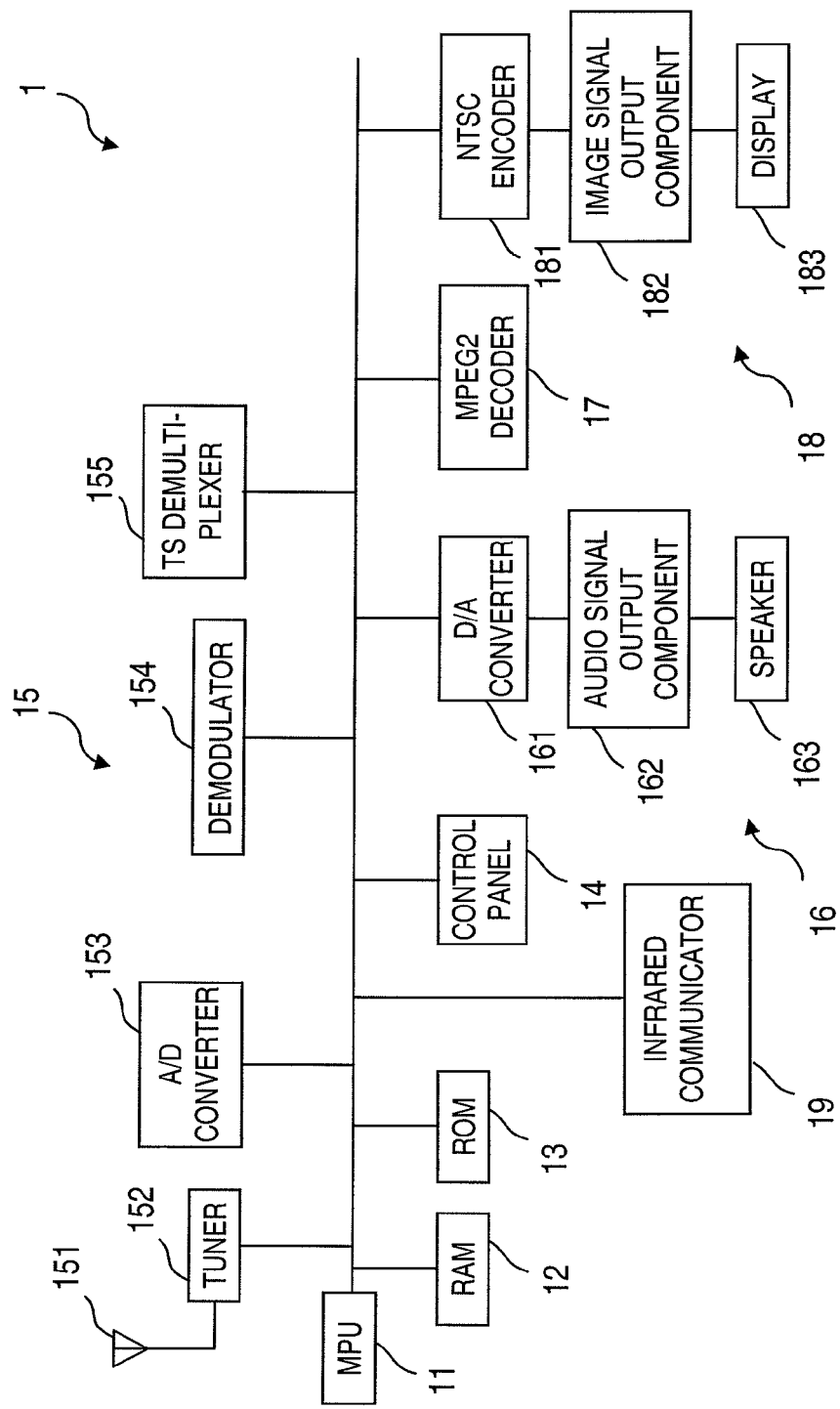
FIG. 1 is a block diagram illustrating a broadcast receiver in accordance with one embodiment of the present invention.

FIG. 1 is a block diagram illustrating a digital broadcast receiver 1. The digital broadcast receiver 1 (e.g., broadcast receiving device) is communicably connected to a remote controller 2 (hereinafter referred to as "remote") shown in FIG. 2 via infrared communication.

The digital broadcast receiver 1 receives an operation input from a user via the remote 2. The digital broadcast receiver 1 receives television broadcasts and outputs one of the television broadcasts to a display 183. The digital broadcast receiver 1 includes an MPU (Micro Processing Unit) 11, a RAM (Random Access Memory) 12, a ROM (Read Only Memory) 13, a control panel 14, a reception component 15, an audio output component 16, an MPEG-2 (Motion Picture Experts Group) decoder 17, an image output component 18 and an infrared communicator 19.

The MPU 11 controls an operation of the entire digital broadcast receiver 1. The RAM 12 readably and writably stores information such as audio information and video information. The ROM 13 stores a control program for operating the MPU 11, for example.

The control panel 14 is used to perform various operations, such as turning the power on and off, and changing the channel. The reception component 15 receives and demodulates television broadcasts. The reception component 15 includes an antenna 151, a tuner 152, an A/D converter 153, a demodulator 154, and a TS demultiplexer 155.

The antenna 151 receives television broadcast waves. The tuner 152 tunes in a preset channel from the television broadcast waves received by the antenna 151. The A/D converter 153 converts an analog output signal of the tuner 152 into a digital signal. The demodulator 154 demodulates output information from the A/D converter 153. The TS demultiplexer 155 separates the output information demodulated by the demodulator 154 by type, and outputs audio information and video information.

The audio output component 16 outputs the audio corresponding to the television broadcast received by the reception component 15. The audio output component 16 includes a D/A converter 161, an audio signal output component 162 and a speaker 163. The D/A converter 161 converts the audio information outputted from the TS demultiplexer 155 (digital information) into an analog audio signal. The audio signal output component 162 outputs the analog audio signal to the speaker 163. The speaker 163 outputs audio corresponding to the analog audio signal.

The MPEG 2 decoder 17 decodes the video information outputted from the TS demultiplexer 155 into pre-compression video information.

The image output component 18 outputs the video information decoded by the MPEG2 decoder 17. The image output component 18 includes an NTSC (National Television Standards Committee) encoder 181, an image signal output component 182 and a display 183 (e.g., monitor). The NTSC encoder 181 converts the video information decoded by the MPEG2 decoder 17 into an NTSC-format television signal. The image signal output component 182 outputs the NTSC-format television signal to the display 183. The display 183 is a display device such as an LCD (Liquid Crystal Display), PDP (Plasma Display Panel), or the like. The display 183 displays video corresponding to the NTSC-format television signal outputted from the image signal output component 182.

The infrared communicator 19 is used to perform various operations from the remote 2, such as turning the power on and off, changing the channel, and changing settings of the digital broadcast receiver 1 (such as viewing control settings).

The digital broadcast receiver 1 receives the television broadcasts as follows. First, a transmitted digital broadcast wave is received by the antenna 151. When the control panel 14 is used to tune in a channel, switching of a transponder or a channel received by the tuner 152 is performed. The received digital broadcast wave is converted into digital information by the A/D converter 153, and demodulated by the demodulator 154.

The digital broadcast wave is transmitted from a transmitting side (transmitting station) as a TS (Transport Stream) packet. The TS packet includes the video information, the audio information, control information including channel information and viewing control table information (e.g., Rating Region Table, hereinafter referred to as RRT), and so forth. The RRT further includes a viewing control table having viewing control conditions. The video information, the audio information and the control information are separated and outputted by the TS demultiplexer 155. Then, the video information, the audio information and the control information are stored in the RAM 12. The audio information is read out from the RAM 12, and is converted into an analog audio signal by the D/A converter 161. Then, audio is outputted from the speaker 163 via the audio signal output component 162.

Also, the video information is read out from the RAM 12, and is decoded into pre-compression video information by the MPEG2 decoder 17. Then, the pre-compression video information is converted into an NTSC-format television signal by the NTSC encoder 181. Then, a video image is displayed on the display 183 via the image signal output component 182.

Figure 2:
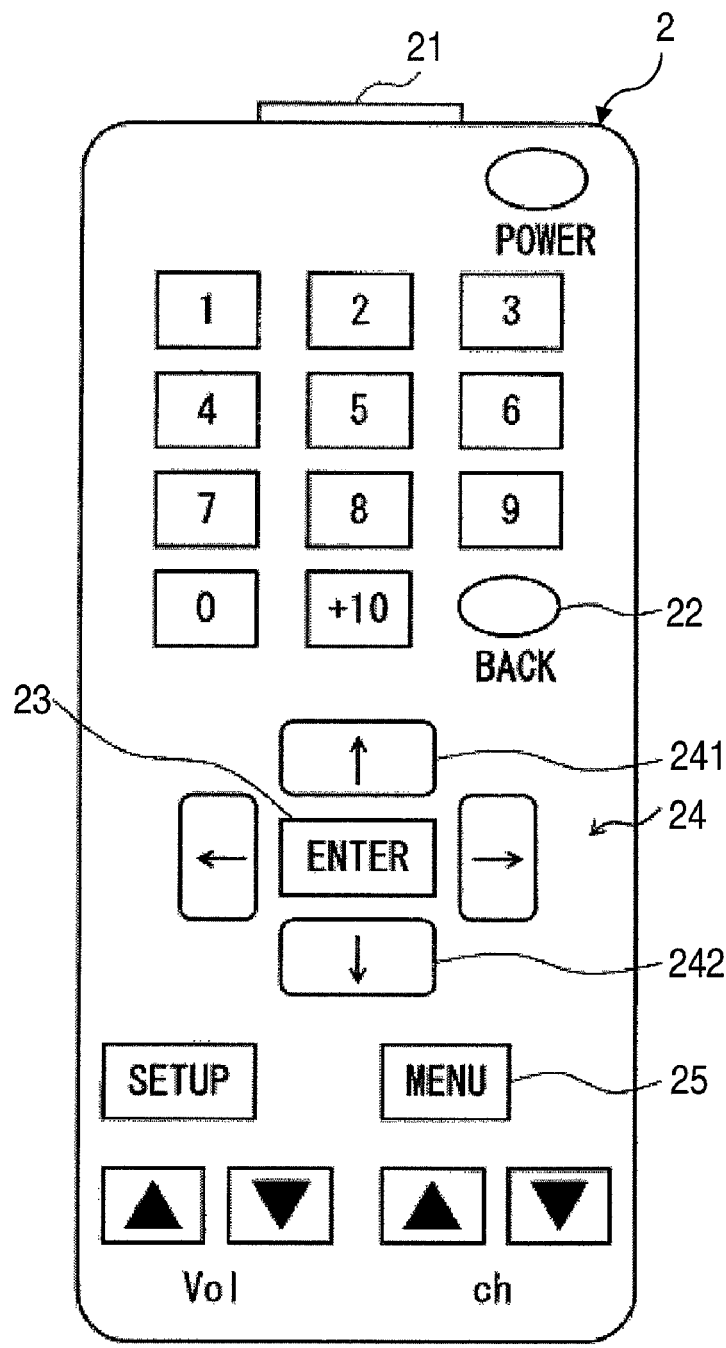
FIG. 2 is a plan view of a remote control of the broadcast receiver illustrated in FIG. 1.

The remote 2 receives operation input from a user. The remote 2 produces an infrared signal corresponding to the operation input. Then, the remote 2 outputs the infrared signal to the digital broadcast receiver 1. The remote 2 includes an infrared signal output component 21, a back key 22, an enter key 23, direction keys 24 and a menu key 25, as shown in FIG. 2. The infrared signal output component 21 produces an operation signal corresponding to a key pressed by the user. The infrared signal output component 21 converts the signal into the infrared signal. Then, the infrared signal output component 21 transmits the signal to the digital broadcast receiver 1.

The back key 22 is pressed to return a currently displayed screen to an original screen. The enter key 23 is pressed to set various settings, such as the viewing control conditions of the digital broadcast receiver 1. The direction keys 24 are pressed to select one of a plurality of categories that can be selected and are displayed on the display 183. The direction keys 24 include an up key 241 and a down key 242. The up key 241 is a key for moving a selected state upward. The down key 242 is a key for moving the selected state downward. The menu key 25 is pressed to display a menu screen when setting various settings, such as the viewing control conditions of the digital broadcast receiver 1.

Figure 3:
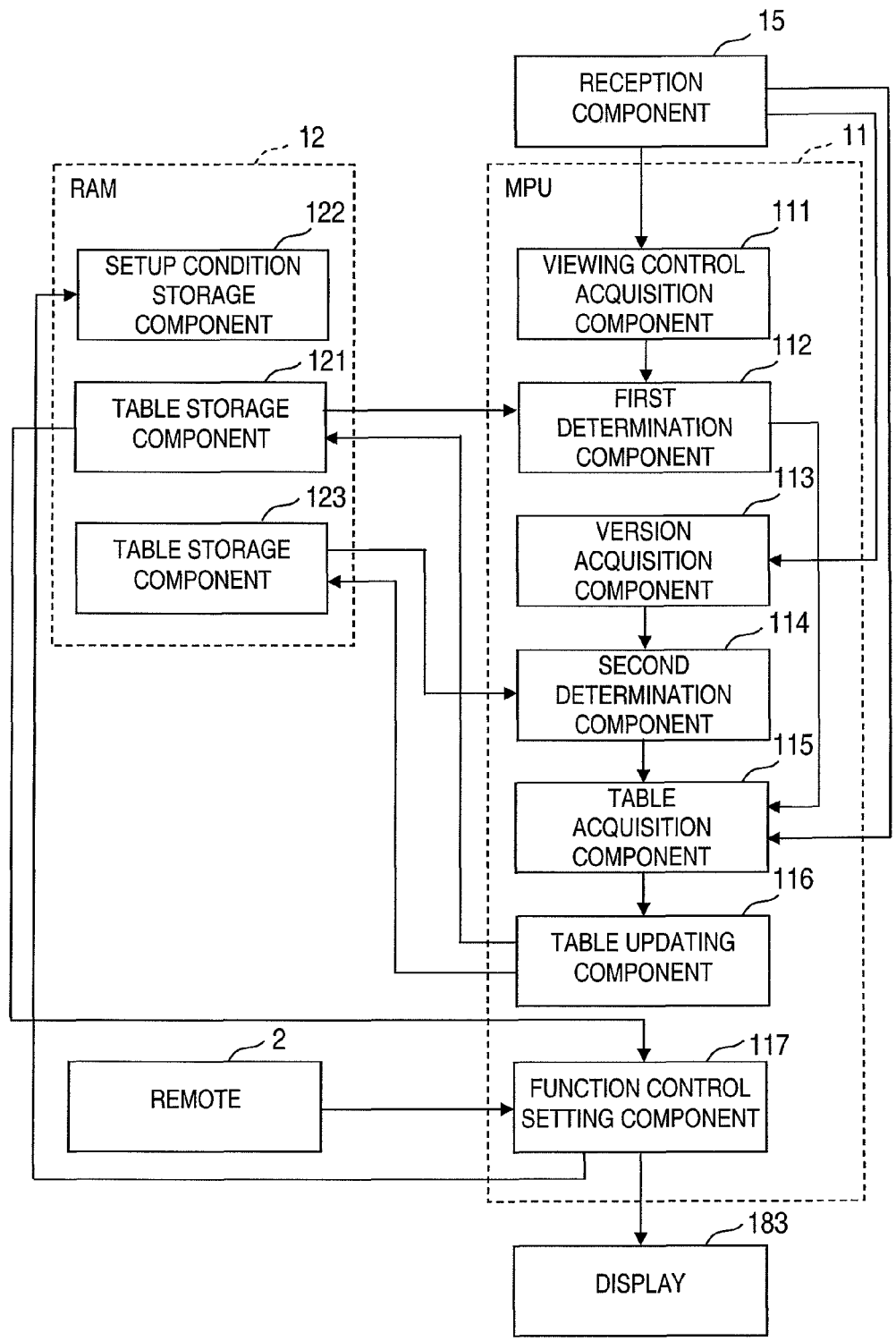
FIG. 3 is a block diagram illustrating a functional configuration of the broadcast receiver illustrated in FIG. 1.

FIG. 3 is a block diagram illustrating a functional configuration of the digital broadcast receiver 1. The MPU 11 functionally includes a viewing control acquisition component 111, a first determination component 112, a version acquisition component 113, a second determination component 114, a table acquisition component 115, a table updating component 116, a function control setting component 117, and other such functional components. The RAM 12 functionally includes a table storage component 121, a setup condition storage component 122 and a version storage component 123.

The MPU 11 reads and executes a control program that has been pre-stored in the ROM 13, etc., shown in FIG. 1. Then, the MPU 11 functions as the viewing control acquisition component 111, the first determination component 112, the version acquisition component 113, the second determination component 114, the table acquisition component 115, the table updating component 116, the function control setting component 117, or another such functional component. Also, the MPU 11 causes the RAM 12 to function as the table storage component 121, the setup condition storage component 122, the version storage component 123 or another such functional component.

Data stored in the RAM 12 and ROM 13 can be stored on a removable recording medium such as a hard disk, optical disk, flexible disk, CD (Compact Disk), DVD (Digital Versatile Disk), semiconductor memory, or the like. In this case, the data can be readable by a hard disk drive, optical disk drive, flexible disk drive, silicon disk drive, cassette medium reader, or other such driver.

The table storage component 121 stores an RRT. Specifically, the table storage component 121 stores a viewing control table of the RRT as a stored viewing control table. The version storage component 123 stores version information as stored version information. The version information indicates a version of the viewing control table. Specifically, the stored version information indicates a version of the stored viewing control table. The table storage component 121 acquires a viewing control table newly acquired by the table acquisition component 115 as an acquired viewing control table. The version storage component 123 acquires version information newly acquired by the version acquisition component 113 as acquired version information. Specifically, the acquired version information indicates a version of the acquired viewing control table. The stored viewing control table and the stored version information are updated (replaced) by the table updating component 116 with the acquired viewing control table and the acquired version information, respectively. Specifically, the stored viewing control table (old viewing control table) and the stored version information (old version information) are deleted. Then, the acquired viewing control table (new viewing control table) is stored in the table storage component 121. Specifically, the acquired RRT corresponding to the acquired viewing control table is stored in the table storage component 121. The acquired version information is stored in the version storage component 123.

The stored viewing control table has a first specific number of two or more columns ("3", for example) and a second specific number of two or more rows ("7", for example). In other words, the first specific number is the number of columns of the stored viewing control table. The second specific number is the number of rows of the stored viewing control table. The stored viewing control table includes the viewing control conditions that are preset according to positions in a column direction and positions in a row direction, as shown in FIG. 4. Each column of the stored viewing control table is set to either an order type or a category type. A column set to the order type includes the viewing control conditions ranked in the order of rating levels from the lowest rating to the highest rating as the row number increases. In other words, the column set to the order type includes the viewing control conditions so that the viewing control becomes less restrictive as the row number increases. A column set to the category type includes the viewing control conditions that vary with the row number. In other words, the column set to the category type includes the viewing control conditions so that type of the viewing control varies with the row number. The acquired viewing control table also has a similar structure.

FIG. 4 is a diagram illustrating the stored viewing control table. As shown in FIG. 4, the first column of the stored viewing control table includes viewing control conditions having a rating category name "TV-AA". The first column of the stored viewing control table is set to the order-type. The viewing control conditions "TV-AA" includes ratings according to MPAA (Motion Picture Association of America) standards. Specifically, beginning with the first row in the first column, the viewing control conditions "TV-AA" include following viewing control conditions: X, NC-17, R, PG-13, PG, G, and NR.

The X in the first row is a rating that is an old version of the NC-17. The NC-17 (No Children under 17, or No One 17 and Under Admitted) in the second row means that no one under 18 years old (17 years or under) is admitted to enjoy the viewing. The R (Restricted) in the third row means that an accompanying a parent or a guardian is required. The PG-13 (Parents strongly cautioned) in the fourth row means that a parent or a guardian must exercise caution over viewing by a child under 13 years old (12 years or under).

The PG (Parental Guidance suggested) in the fifth row means that it is recommended that a parent or a guardian check the content before it is viewed by a child. The G (General audiences) in the sixth row means the work is suitable for all ages. The NR (Not Rated) in the seventh row means that there is no viewing control. A program that is intended for younger viewers and has a high rating level can be blocked with a stricter viewing control. A program that is intended for older viewers and has a low rating level can be blocked with a looser viewing control.

The setup condition storage component 122 stores setup condition information corresponding to the stored viewing control table. Specifically, the setup condition information indicates whether or not each of the viewing controls corresponding to each of the viewing control conditions stored in the stored viewing control table is to be executed. In other words, the setup condition information indicates whether or not the viewing of the program is to be blocked with each of the viewing control conditions stored in the stored viewing control table. The setup condition information stored in the setup condition storage component 122 is set by the function control setting component 117. For example, the stored viewing control table shown in FIG. 4 includes 21 total viewing control conditions (seven rows and three columns). Thus, the setup condition storage component 122 stores the setup condition information corresponding to each of the 21 viewing control conditions.

The viewing control acquisition component 111 acquires a CAD (Content Advisory Descriptor; e.g., program viewing control information). The CAD is included in an event information table (hereinafter referred to as "EIT") received via the reception component 15. The CAD includes a column number and a row number. Then, the CAD specifies viewing control conditions with the column number and the row number.

The first determination component 112 determines whether or not one of a column determination condition and a row determination condition is satisfied. The column determination condition is a condition that the column number of the CAD is greater than the first specific number ("3", for example). The row determination condition is a condition that the row number of the CAD is greater than the second specific number ("7", for example). If one of the column determination condition and the row determination condition is satisfied, then the location indicated by the CAD is a location not included in the stored viewing control table. In other word, if one of the column determination condition and the row determination condition is satisfied, then the CAD is determined to be a CAD corresponding to the updated (new) viewing control table other than the stored viewing control table. Furthermore, the stored viewing control table is determined to be a pre-update (old) viewing control table.

More specifically, the first determination component 112 determines whether or not dimensions_defined, values_defined, rated_dimensions and rating_value satisfy either or both of the following inequalities (1) and (2). The dimensions_defined (e.g., the first specific number; hereinafter referred to as DD) and the values_defined (e.g., the second specific number; hereinafter referred to as VD) are included in the RRT corresponding to the stored viewing control table. The rated_dimensions (e.g., column number information; hereinafter referred to as RD) and the rating_value (e.g., row number information; hereinafter referred to as RV) are included in the CAD acquired by the viewing control acquisition component 111.

$$RD > DD \quad (1): \text{column determination condition}$$

$$RV > VD \quad (2): \text{row determination condition}$$

For example, the digital broadcast receiver 1 can be relocated from one area (hereinafter referred to as first area) to another area (hereinafter referred to as second area) when the owner moves, etc. Even if the RRT received in the first area and the RRT received in the second area have the same version information, the contents of the viewing control table may not be the same. However, if the first determination component 112 determines that the CAD acquired by the viewing control acquisition component 111 satisfies at least one of the column determination condition and the row determination condition, then the location indicated by the CAD is determined to be a location not included in the stored viewing control table. In other word, if one of the column determination condition and the row determination condition is satisfied, then the CAD is determined to be a CAD corresponding to the updated (new) viewing control table (e.g., viewing control table corresponding to the second area) other than the stored viewing control table. Furthermore, the stored viewing control table is determined to be a pre-update (old) viewing control table (e.g., viewing control table corresponding to the first area).

The version acquisition component 113 acquires the version information of the viewing control table corresponding to the RRT via the reception component 15.

The second determination component 114 determines whether or not the acquired version information acquired by the version acquisition component 113 matches the stored version information corresponding to the stored viewing control table. That is, if the acquired version information does not match with the stored version information, then the second determination component 114 determines that the stored viewing control table does not match the viewing control table corresponding to the CAD acquired by the viewing control acquisition component 111.

The table acquisition component 115 acquires the RRT received via the reception component 15. The table acquisition component 115 produces the viewing control table based on the acquired RRT.

When the RRT has been acquired by the table acquisition component 115, the table updating component 116 deletes the stored viewing control table and the stored version information. Then, the table updating component 116 stores the acquired viewing control table acquired by the table acquisition component 115 in the table storage component 121 and the acquired version information acquired by the version acquisition component 113 in the version storage component 123.

The function control setting component 117 receives the operation input from the user via the remote 2. Then, the function control setting component 117 displays the stored viewing control table on the display 183 based on the received operation input. The function control setting component 117 sets whether or not to execute the viewing control corresponding to the CAD acquired by the viewing control acquisition component 111 via the stored viewing control table displayed on the display 183, as shown in FIGS. 5A and 5B.

Figure 5A:
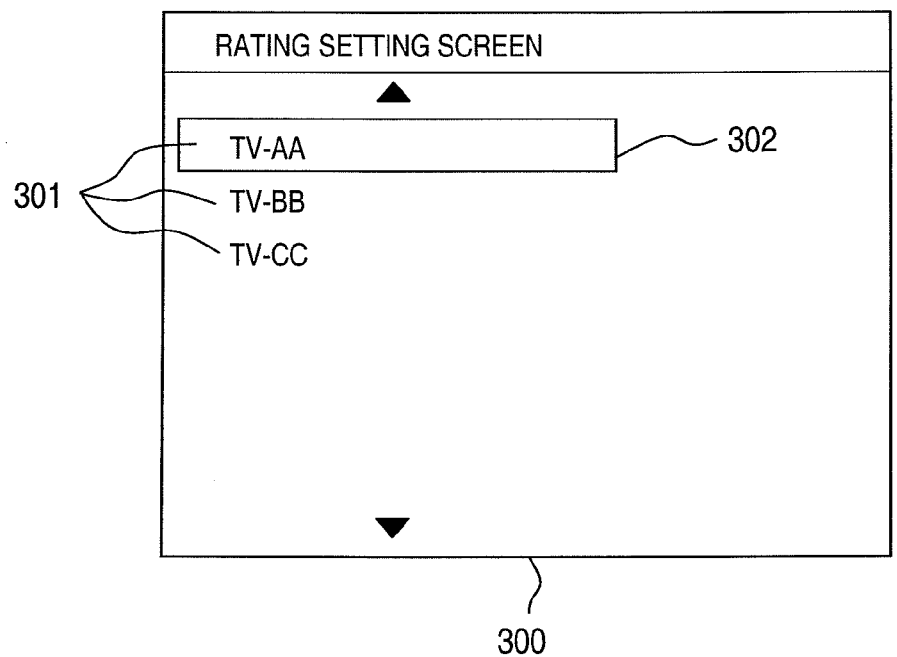
FIG. 5A is a screen shot of a rating category selection screen corresponding to the viewing control table.
Figure 5B:
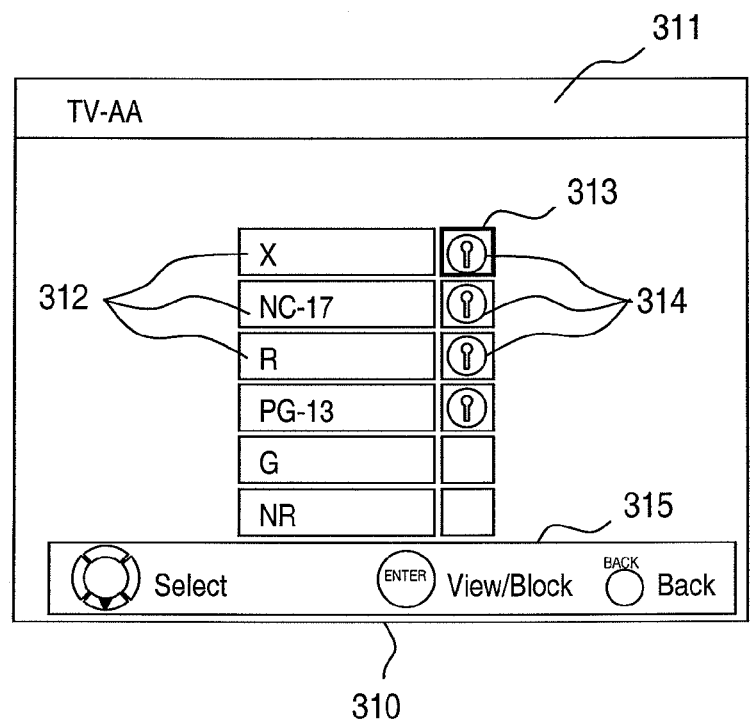
FIG. 5B is a screen shot of a viewing control setting screen corresponding to the viewing control table.

FIG. 5A is a screen shot of a rating category selection screen 300 corresponding to the stored viewing control table. FIG. 5B is a screen shot of a viewing control setting screen corresponding to the stored viewing control table.

The function control setting component 117 displays the rating category selection screen 300 shown in FIG. 5A when an operation signal corresponding to the menu key 25 has been received. As shown in FIG. 5A, the rating category selection screen 300 displays a category name display component 301 and a selection mark 302. The category name display component 301 displays the rating category names of the stored viewing control table shown in FIG. 4. The selection mark 302 indicates a selected state.

When an operation signal corresponding to the up key 241 is received, the function control setting component 117 moves the selection mark 302 upward and changes the category name display component 301 in the selected state. Also, when an operation signal corresponding to the down key 242 is received, the function control setting component 117 moves the selection mark 302 downward and changes the category name display component 301 in the selected state.

When an operation signal corresponding to the enter key 23 is received, the function control setting component 117 displays the viewing control setting screen 310 shown in FIG. 5B. The viewing control setting screen 310 includes a category name display component 311, viewing control condition display components 312, a selection mark 313, block marks 314 and a guidance display component 315. The category name display component 311 displays the rating category name selected through the rating category selection screen 300. The viewing control condition display components 312 display the viewing control conditions stored in a column of the stored viewing control table corresponding to the selected rating category. The selection mark 313 indicates the selected state. The block marks 314 display whether or not the viewing control corresponding to each of the viewing control conditions will be executed. In other words, the block marks 314 indicate whether or not the viewing of the program corresponding to each of the viewing control conditions will be blocked. The block marks 314 are displayed to the right of the viewing control condition display components 312. The guidance display component 315 displays operation guidance information.

The guidance display component 315 display first operation guidance information, second operation guidance information and third operation guidance information from left to right. The first operation guidance information indicates using the up key 241 and the down key 242 to change the selected state of the viewing control condition display components 312. The second operation guidance information indicates using the enter key 23 to set whether or not the viewing control is to be executed (that is, whether or not to block the viewing of the program corresponding to the viewing control conditions). The third operation guidance information indicates using the back key 22 to return to the immediately prior screen (e.g., the rating category selection screen 300 shown in FIG. 5A).

When an operation signal corresponding to the up key 241 on the remote 2 is received, the function control setting component 117 moves the selection mark 313 upward and changes the selected state of the viewing control condition display components 312. When an operation signal corresponding to the down key 242 on the remote 2 is received, the function control setting component 117 moves the selection mark 313 downward and changes the selected state of the viewing control condition display components 312.

When an operation signal corresponding to the enter key 23 is received on the viewing control setting screen 310 shown in FIG. 5B, the function control setting component 117 performs setting so as to execute the viewing control corresponding to the viewing control condition display components 312. In other words, the function control setting component 117 performs setting to block the viewing of the program corresponding to the viewing control conditions and stores the setting in the setup condition storage component 122 so that the viewing control will be executed. Then, the function control setting component 117 displays the block marks 314 indicating that the viewing control is to be executed.

When the type of column of the viewing control conditions being displayed on the viewing control setting screen 310 is order type, the function control setting component 117 performs setting to execute the viewing control corresponding to the viewing control condition display component 312 in the selected state and all of the viewing control condition display components 312 displayed above the selected viewing control condition display component 312. This is because all of the viewing control condition display components 312 displayed above the selected viewing control condition display component 312 have lower rating level than the selected viewing control condition display component 312 in the selected state. Then, the function control setting component 117 displays the block marks 314 indicating that the viewing controls are to be executed.

Figure 6:
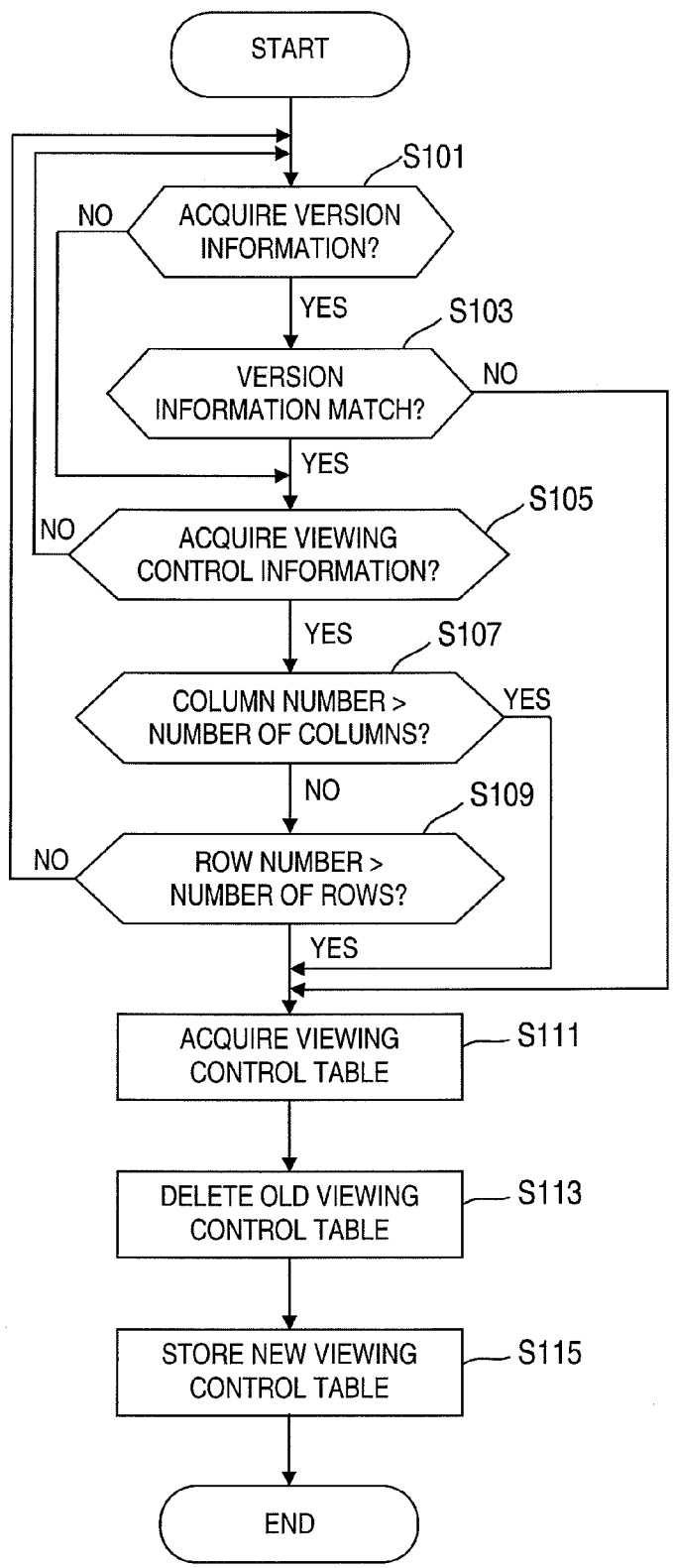
FIG. 6 is a flowchart illustrating an operation of the broadcast receiver illustrated in FIG. 1.

FIG. 6 is a flowchart illustrating an operation of the digital broadcast receiver 1. The RRT is received ahead of time by the table acquisition component 115 via the reception component 15. The stored viewing control table is produced based on the acquired RRT, and stored in the table storage component 121. The stored version information is acquired ahead of time by the version acquisition component 113 via the reception component 15, and stored in the version storage component 123.

First, the version acquisition component 113 determines whether or not the version information has been acquired (S101). If the version acquisition component 113 determines that the version information has not been acquired (No in S101), then the processing proceeds to step S105. If the version acquisition component 113 determines that version information has been acquired (Yes in S101), then the second determination component 114 determines whether or not the acquired version information acquired in step S101 matches the stored version information corresponding to the RRT stored in the version storage component 123 (S103). If the second determination component 114 determines that there is no match (No in S103), then the processing proceeds to step S111. If the second determination component 114 determines that there is a match (Yes in S103), then the viewing control acquisition component 111 determines whether or not the CAD has been acquired by the viewing control acquisition component 111.

If the viewing control acquisition component 111 determines that the CAD has not been acquired (No in S105), then the processing is returned to step S101, and the processing from step S101 is repeated. If the viewing control acquisition component 111 determines that the CAD has been acquired (Yes in S105), then the first determination component 112 determines whether or not the column number of the CAD (that is, RD) is greater than the first specific number (that is, DD) (S107). If the first determination component 112 determines that the RD is greater than the DD (Yes in S107), then the processing proceeds to step S111.

If the first determination component 112 determines that the RD is less than or equal to the DD (No in S107), then the first determination component 112 determines whether or not the row number of the CAD (that is, RV) is greater than the first specific number (that is, VD) (S109). If the first determination component 112 determines that the RV is greater than the VD (Yes in S109), then the processing proceeds to step S111. If the first determination component 112 determines that the RV is less than or equal to the VD (No in S109), then the processing is returned to step S101, and the processing from step S101 is repeated.

If the answer is No in step S103, or if the answer is Yes in step S107, or if the answer is Yes in step S109, then the RRT is acquired by the table acquisition component 115 via the reception component 15. Furthermore, the acquired viewing control table is produced based on the acquired RRT (S111). Then, the stored viewing control table and the stored version information are deleted by the table updating component 116 (S113). Next, the acquired viewing control table produced in step S111 is stored in the table storage component 121 and the acquired version information acquired in step S101 are stored in the version storage component 123 (S115), and the processing is concluded.

With the broadcast receiver 1, the viewing control table information (RRT) is acquired. The RRT includes viewing control table having the first specific number of two or more ("3", for example) columns and the second specific number of two or more ("7", for example) rows. The viewing control conditions are specified in the viewing control table. The viewing control conditions are preset according to the positions in the column direction and the positions in the row direction. The viewing control table is stored in the table storage component 121 as the stored viewing control table. Then, the CAD is acquired. The CAD specifies viewing control conditions for each program with the column number and the row number. Then, it is determined whether or not one of the column determination condition and the row determination condition is satisfied. The column determination condition is a condition that the column number of the CAD is greater than the first specific number. The row determination condition is a condition that the row number of the CAD is greater than the second specific number. If it is determined that one of the column determination condition and the row determination condition is satisfied, then the RRT is acquired via the reception component 15. Furthermore, the stored viewing control table is deleted, and the acquired viewing control table is stored in the table storage component 121. Thus, the RRT can be updated at the proper timing.

Specifically, if one of the column determination condition and the row determination condition is satisfied, then it can be concluded that the RRT stored in the table storage component 121 is different from the RRT corresponding to the acquired CAD. Thus, the RRT is acquired via the reception component 15. Then, the RRT stored in the table storage component 121 is deleted. Furthermore, the acquired RRT is stored in the table storage component 121. Therefore, the RRT can be updated at the proper timing.

Also, the stored version information of the stored viewing control table is stored in the version storage component 123. Furthermore, the acquired version information is acquired. Then, it is determined whether or not the acquired version information matches the stored version information. If it is determined that there is no match, then the RRT is acquired via the reception component 15. Then, the stored viewing control table and the stored version information are deleted. Furthermore, the acquired viewing control table is stored in the table storage component 121 and the acquired version information is stored in the version storage component 123. Thus, the RRT can be updated at the proper timing.

Specifically, if it is determined that the acquired version information does not match the stored version information, then it can be concluded that the RRT stored in the table storage component 121 is different from the RRT corresponding to the acquired CAD. Thus, the RRT is further acquired via the reception component 15. Then, the RRT stored in the table storage component 121 is deleted. Furthermore, the acquired RRT is stored in the table storage component 121. Therefore, the RRT can be updated at the proper timing.

The broadcast receiver 1 can be any type of broadcast receiving device that receives television broadcasts and outputs the television broadcasts to the display 183 so that the television broadcasts are visible from outside. For instance, the broadcast receiving device can be a device that receives analog broadcasts or both analog and digital broadcasts. However, the broadcast receiver 1 has a function for acquiring the program viewing control information corresponding to the CAD and the viewing control table information corresponding to the RRT.

The display 183 can be configured as a device that is separate from the digital broadcast receiver 1. For example, the display 183 can be a monitor provided to a personal computer or the like.

At least the function control setting component 117 can receive the operation input from the user via the control panel 14 instead of the remote 2.

In this embodiment, a case was described in which the second determination component 114 determined whether or not the RRT stored in the table storage component 121 matched the RRT corresponding to the CAD acquired by the viewing control acquisition component 111 based on the version information. However, it can be determined based on some other information.

For example, the second determination component 114 can determine whether or not the RRT stored in the table storage component 121 matches the RRT corresponding to the CAD acquired by the viewing control acquisition component 111 based on the rating category name information included in the RRTs. Specifically, the second determination component 114 can determine whether or not the RRT stored in the table storage component 121 matches the RRT corresponding to the CAD acquired by the viewing control acquisition component 111 by determining whether or not the rating category name included in the RRT corresponding to the CAD acquired by the viewing control acquisition component 111 matches the rating category name of the RRT stored in the table storage component 121.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A broadcast receiving device for receiving a television broadcast, the broadcast receiving device comprising:
a table storage component configured to store a first viewing control table with viewing control conditions for viewing control, the viewing control conditions for the viewing control being arranged as a matrix consisting of a first specific number of columns and a second specific number of rows in the first viewing control table;
a viewing control acquisition component configured to acquire program viewing control information from the television broadcast, the program viewing control information specifying the viewing control conditions for a program using a column number and a row number;
a first determination component configured to determine whether or not one of a following is satisfied: a column determination condition that the column number of the program viewing control information is greater than the first specific number of the first viewing control table, and a row determination condition that the row number of the program viewing control information is greater than the second specific number of the first viewing control table, the first determination component being further configured to determine whether or not one of the column determination condition and the row determination condition is satisfied in response to the first determination component determining that the other of the column determination condition and the row determination condition is not satisfied;
a table acquisition component configured to acquire a second viewing control table via the television broadcast in response to the first determination component determining that one of the column determination condition and the row determination condition is satisfied; and
a table updating component configured to replace the first viewing control table with the second viewing control table.

2. The broadcast receiving device according to claim 1, wherein
the table storage component is further configured to store each of the viewing control conditions according to a column number of the first viewing control table and a row number of the first viewing control table.

3. The broadcast receiving device according to claim 2, wherein
the table updating component is further configured to delete the first viewing control table stored in the table storage component when the second viewing control table is acquired by the table acquisition component, and store the second viewing control table in the table storage component.

4. The broadcast receiving device according to claim 3, further comprising
a version storage component configured to store first version information indicating a version of the first viewing control table;
a version acquisition component configured to acquire second version information indicating a version of the second viewing control table via the television broadcast; and
a second determination component configured to determine whether or not the second version information acquired by the version acquisition component matches the first version information stored in the version storage component,
the table acquisition component being further configured to acquire the second viewing control table via the television broadcast when the second determination component determines that the second version information does not match the first version information, and
the table updating component being further configured to replace the first viewing control table and the first version information with the second viewing control table and the second version information, respectively.

5. The broadcast receiving device according to claim 4, wherein
the table updating component is further configured to delete the first viewing control table stored in the table storage component and the first version information stored in the version storage component when the second viewing control table is acquired by the table acquisition component, and store the second viewing control table in the table storage component and the second version information in the version storage component, respectively.

6. The broadcast receiving device according to claim 1, further comprising
aversion storage component configured to store first version information indicating a version of the first viewing control table;
a version acquisition component configured to acquire second version information indicating a version of the second viewing control table via the television broadcast; and
a second determination component configured to determine whether or not the second version information acquired by the version acquisition component matches the first version information stored in the version storage component,
the table acquisition component being further configured to acquire the second viewing control table via the television broadcast when the second determination component determines that the second version information does not match the first version information, and
the table updating component being further configured to replace the first viewing control table and the first version information with the second viewing control table and the second version information, respectively.

7. A viewing control method for a broadcast receiving device for receiving a television broadcast, comprising:
providing the broadcast receiving device with a first viewing control table having viewing control conditions for viewing control, the viewing control conditions for the viewing control being arranged as a matrix consisting of a first specific number of columns and a second specific number of rows in the first viewing control table;
acquiring program viewing control information from the television broadcast, the am viewing control information specifying the viewing control conditions for a program using a column number and a row number in the broadcast receiving device;
determining whether or not one of a following is satisfied in the broadcast receiving device: a column determination condition that the column number of the program viewing control information is greater than the first specific number of the first viewing control table, and a row determination condition that the row number of the program viewing control information is greater than the second specific number of the first viewing control table, the determination including determining whether or not one of the column determination condition and the row determination condition is satisfied in response to the broadcast receiving device determining that the other of the column determination condition and the row determination condition is not satisfied;
acquiring a second viewing control table via the television broadcast in the broadcast receiving device in response to the broadcast receiving device determining that one of the column determination condition and the row determination condition is satisfied; and
replacing the first viewing control table with the second viewing control table in the broadcast receiving device.

* * * * *